United States Patent [19]

Saito

[11] Patent Number: 5,045,925
[45] Date of Patent: Sep. 3, 1991

[54] APPARATUS FOR ACHIEVING COMPRESSION ENCODING ON COMPONENTS OF IMAGE SIGNAL

[75] Inventor: Osamu Saito, Tokyo, Japan

[73] Assignee: Fuji Photo Film Co., Ltd., Kanagawa, Japan

[21] Appl. No.: 480,658

[22] Filed: Feb. 15, 1990

[30] Foreign Application Priority Data

Feb. 16, 1989 [JP] Japan .................................... 1-35077

[51] Int. Cl.⁵ ...................... H04N 7/133; H04N 11/04
[52] U.S. Cl. ...................................... 358/13; 358/133; 358/135; 358/138
[58] Field of Search ................. 358/133, 138, 135, 13; 364/725

[56] References Cited

U.S. PATENT DOCUMENTS

| | | | |
|---|---|---|---|
| 4,394,774 | 7/1983 | Widergrin | 358/13 |
| 4,707,738 | 11/1987 | Ferre | 358/138 |
| 4,780,761 | 10/1988 | Daly | 358/133 |
| 4,982,282 | 1/1991 | Saito | 358/133 |

Primary Examiner—Howard W. Britton

[57] ABSTRACT

An image signal compression encoding apparatus achieving a two-dimensional orthogonal transformation encoding includes encoders to encode dc and ac components. For the encoders, each time the luminance signal Y, the color difference signal R−Y, or the color difference signals B−Y is to be encoded, an encoding table is changed. In these encoders, for example, the number of blocks are counted to detect events that the respective data amounts of the luminance signal Y and the color difference signals R−Y and B−Y are reached so as to alter the encoding table. This apparatus uses an appropriate encoding table by means of which the luminance signal Y and the color difference signals R−Y and B−Y can be encoded.

11 Claims, 4 Drawing Sheets

| SWITCH SIGNAL | | | OPERATION |
|---|---|---|---|
| $S_2$ | $S_1$ | $S_0$ | |
| 0 | 0 | 1 | Y-DC PROCESSING |
| 0 | 1 | 0 | Cr-DC PROCESSING |
| 0 | 1 | 1 | Cb-DC PROCESSING |
| 1 | 0 | 1 | Y-AC PROCESSING |
| 1 | 1 | 0 | Cr-AC PROCESSING |
| 1 | 1 | 1 | Cb-AC PROCESSING |
| 0 | 0 | 0 | INITIALIZATION |

| SWITCH SIGNAL $S_2$ $S_1$ $S_0$ | OPERATION |
|---|---|
| 0 0 1 | Y-DC PROCESSING |
| 0 1 0 | Cr-DC PROCESSING |
| 0 1 1 | Cb-DC PROCESSING |
| 1 0 1 | Y-AC PROCESSING |
| 1 1 0 | Cr-AC PROCESSING |
| 1 1 1 | Cb-AC PROCESSING |
| 0 0 0 | INITIALIZATION |

APPARATUS FOR ACHIEVING COMPRESSION ENCODING ON COMPONENTS OF IMAGE SIGNAL

BACKGROUND OF THE PRESENT INVENTION

1. Field of the Present Invention

The present invention relates to an apparatus for conducting a compression encoding on an image signal and particularly to an image signal compression encoding apparatus for achieving different processing for the respective signal components constituting image data.

2. Description of the Prior Art

When loading a memory with digital image data such as image data produced by an electronic still camera, in order to minimize the amount of storage data so as to reduce the storage capacity of the memory, various kinds of compression encoding have been employed. Particularly, the two-dimensional orthogonal transformation encoding is capable of accomplishing the encoding with a high compression ratio. Furthermore, a distortion of an image associated with the encoding can also be suppressed. Consequently, this encoding has been broadly adopted.

In the two-dimensional orthogonal transformation encoding, a field of image data is subdivided into a predetermined number of blocks to conduct the two-dimensional orthogonal transformation encoding on image data of each block thus produced. The resultant data, namely, a transformation coefficient is compared with a predetermined threshold value to truncate or round off a portion not exceeding the threshold value (coefficient truncation). Namely, the transformation coefficient not exceeding the threshold value is processed as data of zero in the subsequent processing. The obtained coefficient is then divided by a predetermined value of a quantization step, namely, a normalization coefficient. In other words, a quantization or normalization is achieved by use of the step width. This can suppress a value of the transformation coefficient, namely, a dynamic range of amplitude.

Subsequently, the normalized coefficient is encoded, for example, by use of the Huffman encoding, thereby completing the compression encoding.

In a case where the shooting of an image through an imaging device comprising photosensitive cells results in image data being subjected to the compression encoding, and the number of effective photosensitive cells varies as 200 thousand, 400 thousand, etc. among the commercially available imaging devices, the number of pixels forming the image data cannot be fixedly determined. Therefore, an image is subdivided in the compression encoding into blocks, the number of which is dependent upon the numbers of photosensitive cells included in the imaging device used. In consequence, when different encoding operations are necessary for direct-current, dc, and alternate-current, ac, components, respectively, a problem arises in which a switching between these operations cannot be accomplished depending on a preset criterion, which may, for example, be when a count of the blocks reaches a predetermined value.

For example, when the image data includes color image data, for each component of a luminance signal Y and color difference signals R−Y and B−Y, it is desirable to employ a different normalization and a different encoding operation. Namely, for example, since the luminance signal Y and color difference signals R−Y and B−Y possess frequency components different from each other, the normalization is to be desirably achieved with different normalization coefficients for the respective signals. Furthermore, since the transformation coefficient of each component comprises dc and ac components and the amount of data to be processed varies therebetween, the encoding thereof is required to be conducted depending on a Huffman table suitable for data of each component.

Consequently, when a compression encoding is carried out on such color image data, the normalization and the encoding are switched between the dc and ac components for each component of the luminance signal Y and color difference signals R−Y and B−Y. This necessitates the block count of image data of each component as the switching ciriterion to be a fixed value. In consequence, as described above, a disadvantage takes place in which for image data from solid-state imaging devices having different effective photosensitive cells, the compression encoding cannot be appropriately conducted.

SUMMARY OF THE INVENTION

It is therefore an object of the present invention to provide an image signal compression encoding apparatus in which the image data have different effective photosensitive cells, the normalization and the encoding can be switched between the respective component data to be processed in the different fashions, thereby removing the disadvantage of the prior art.

In accordance with the present invention, an image signal compression encoding apparatus in which digital image data forming a screen image is subdivided into plural blocks so as to accomplish a two-dimensional orthogonal transformation encoding for image data of each block comprises orthogonal transform means for accomplishing a two-dimensional orthogonal transformation on digital image data of the plural subdivided blocks, normalizing means for normalizing data resultant from the orthogonal transformation conducted by the orthogonal transform means, encode means for encoding either data which has undergone the orthogonal transformation in the orthogonal transform means or data normalized by the normalizing means, and control means for detecting an event that an output from the orthogonal transform means reaches an amount of data of each component of the digital image data forming the screen image so as to produce a control signal depending on the event. Each component is associated with different processing. The control means switches processing between the normalize means and encode means in response to the control signal.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring next to the drawings, a description will be given in detail of an embodiment of the image signal compression encoding apparatus in accordance with the present invention.

Figure 1:
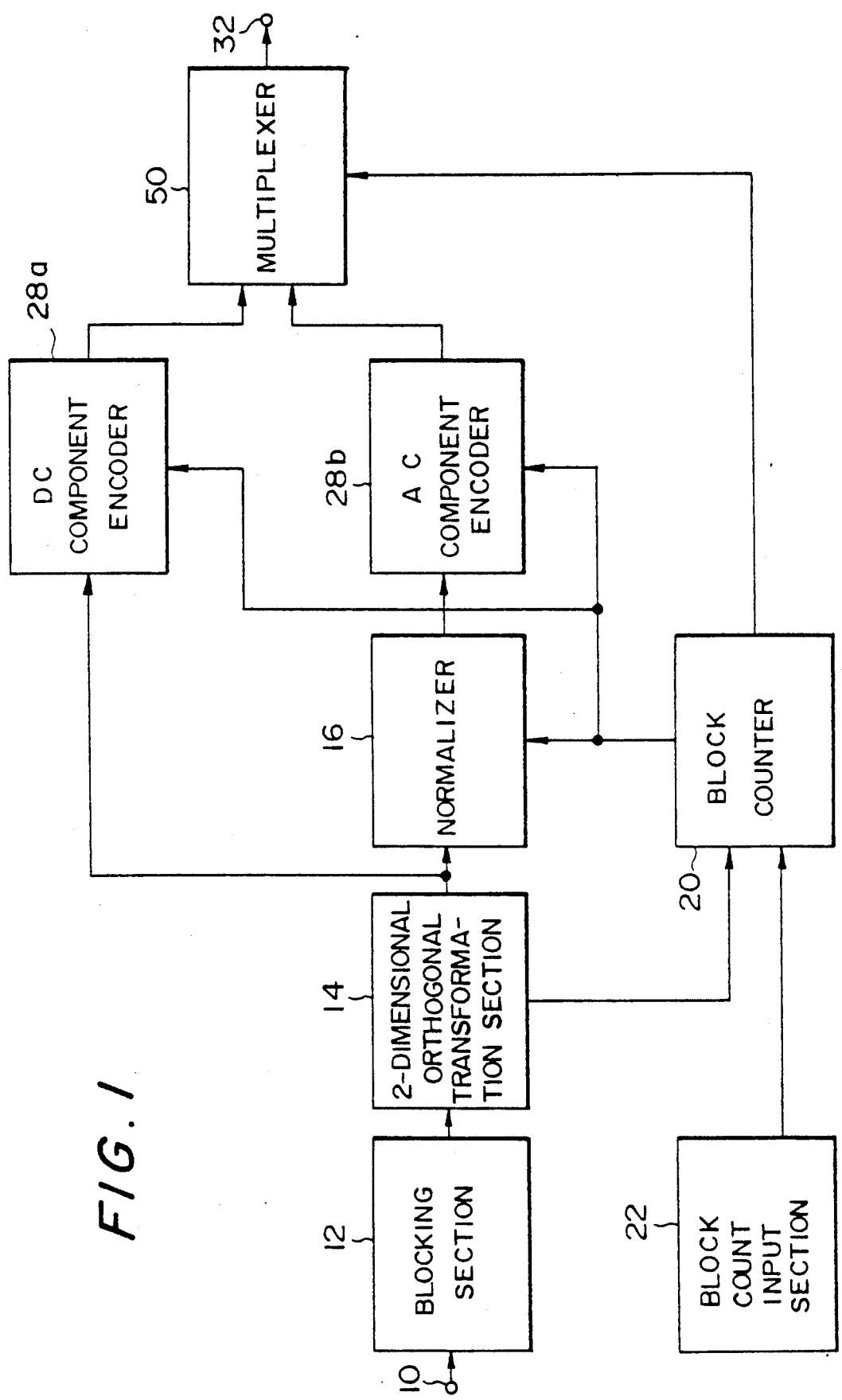
FIG. 1 is a schematic block diagram showing an embodiment of the image signal compression encoding apparatus in accordance with the present invention.

FIG. 1 shows an embodiment of the image signal compression encoding apparatus in accordance with the present invention.

This apparatus includes a block generating or blocking section 12. The blocking section comprises a frame buffer which receives as an input thereto via an input terminal 10 a frame of still picture data produced by means of an electonic still camera so as to store the data therein. The image data of a frame stored in the blocking section 12 is subdivided into a plurality of blocks to be read out therefrom in a block-by-block manner so as to be sent to a two-dimensional orthogonal transformation section 14. This section 14 accomplishes a two-dimensional orthogonal transformation on the image data in the block unit. The transformation may be a known orthogonal transformation such as the discrete cosine transformation or the Hadamard transformation.

The blocks of image data which have undergone the transformation in the section 14 are arranged in the horizontal and vertical directions so that the upper-left and lower-right corners include the lower-order and higher-order data items. The transformation section 14 produces an output, which is subdivided into dc and ac components so as to be fed to a dc component encoding section 28a and a normalizing section 16.

The normalizer 16 achieves a coefficient truncation of the image data thus transformed in the transformation section 14, namely, on the ac component of the transformation coefficient so as to normalize the resultant data. In the truncation, the transformation coefficient after the orthogonal transformation is compared with a predetermined threshold value to round off a portion not exceeding the threshold value. In the normalization, the coefficient resulting from the truncation is divided by a predetermined quantization step value, namely, a normalization coefficient $\alpha$. The normalization coefficient $\alpha$ can be attained, for example, such that activities of the respective blocks are totaled so as to determine the coefficient $\alpha$ from a lookup table based on the total value.

The normalizing section 16 normalizes the data depending on the established normalization coefficient $\alpha$. That is, the ac component data of the transformation coefficient of each block is divided by the normalization coefficient $\alpha$. The coefficient $\alpha$ is set for each of the luminance signal Y and color difference signals R−Y and B−Y, which will be described later. The normalizing section 16 receives a switch signal from a block counter 20, which will be described later, namely, switch instructions to carry out a switching between the luminance signal Y and color difference signals R−Y and B−Y, thereby changing the normalization coefficient $\alpha$.

Figure 5:
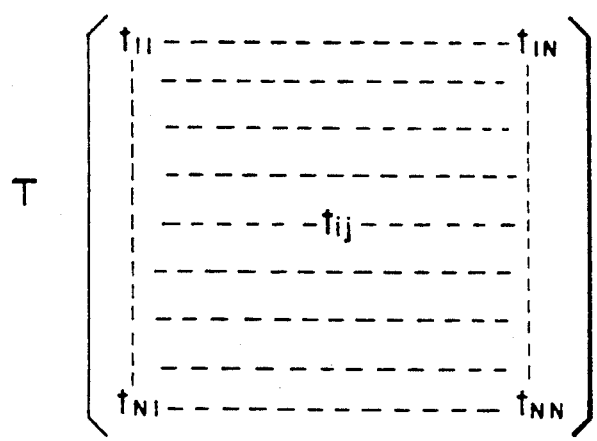
FIG. 5 is a diagram schematically showing an example of weight table data.

In the normalization, in place of the operation to divide the ac component of the transformation coefficient which has undergone the truncation by the selected normalization coefficient value $\alpha$, it may also be possible to employ a combination of a normalization coefficient $\alpha$ with data stored in a weight table T as shown in FIG. 5. In the transformation coefficient, the lower-frequency component is more important as data than the higher-frequency component. Consequently, the weight table T as shown in FIG. 5 includes smaller and larger values assigned to the lower-frequency and higher-frequency components, respectively. The normalization may be conducted by dividing the coefficient thus truncated by a value $\alpha$ T, which is a product developed between data of the table T and the normalization coefficient $\alpha$.

When the weight table T is adopted for a normalization, the weight table T and the normalization coefficient $\alpha$ may be altered in a change-over associated with, for example, the luminance signal Y and the color difference signals R−Y and B−Y. In a change-over associated with the color signals R−Y and B−Y, only the normalization coefficient $\alpha$ may be altered while the weight table T is retained.

In a case where the transformation coefficient is divided by $\alpha$ T for the normalization, when the value of $1/(\alpha \text{ T})$ is computed beforehand so as to multiply this value by the transformation coefficient, the number of dividers employed can be minimized. This results in a reduction of the size of the apparatus.

Figures 3, 4:
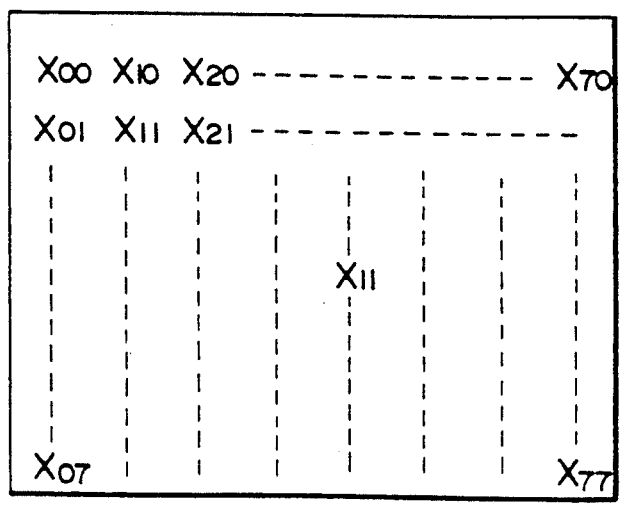
FIG. 3 is a diagram schematically showing switch signals created from a block counter of FIG. 1.
FIG. 4 is a schematic diagram showing an example of pixel data constituting a block.
Figure 6:
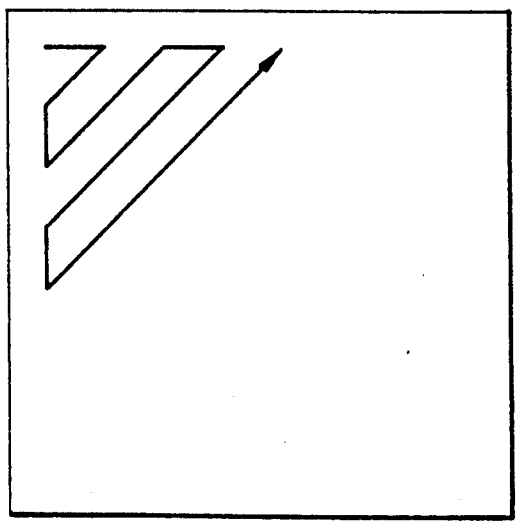
FIG. 6 is a schematic diagram showing a sequence of encoding a run length and a non-zero amplitude.

The normalized transformation coefficient is arranged in the form of a block, like in the case of the pixel data shown in FIG. 4, such that the values thereof are scanned along a line of a zigzag shape, as shown in FIG. 6, beginning from the lower-frequency components.

The normalizer 16 delivers an output to an ac component encoding section 28b. The encoder 28b carries out the two-dimensional Huffman encoding. In this operation, the normalized transformation coefficient of which the values are supplied through a zigzag scanning as described above includes consecutive zeros in many cases. Consequently, a quantity of data containing consecutive zeros, namely, a zero-run length is detected to attain the zero-run length and an amplitude of non-zeros, thereby achieving the two-dimensional Huffman encoding thereon. The ac component encoder 28b switches the Huffman tables associated with the luminance signal Y and the color difference signals R−Y and B−Y depending on the signal from the block counter. The encoder 28b delivers an output to a multiplexer 50.

The dc component encoder 28a carries out a two-dimensional Huffman encoding on the dc component of the transformation coefficient supplied thereto in the similar fashion to that of the encoder 28b. The encoder 28a may be supplied with, in place of the input from the transformation section 14, an dc component normalized in the normalizing section 16.

The encoder 28a switches, like in the case of the encoder 28b, the Huffman tables for the luminance signal Y and the color difference signals R−Y and B−Y based on a signal from the block counter. The dc component encoder 28a also delivers an output to the multiplexer 50.

The multiplexer 50a is changed over in response to a signal from the block counter 20 so as to sequentially select inputs from the dc component encoder 28a and the ac component encoder 28b, thereby supplying an output to an output terminal 32. The dc and ac components which have undergone the two-dimensional Huffman encoding are fed to the output terminal 32. The data is sent from the output terminal 32 to a transmission path, not shown, or is written onto a recording medium such as a magnetic disk, not shown.

In this apparatus, the block counter 20 receives as an input thereto data indicating the number of blocks supplied from the transformation section 14 to the dc component encoder 28a or the normalizer 16. The block counter 20 is also supplied from a block count input section 22 with total block counts N1, N2, and N3 respectively preset for the luminance signal Y and the color difference signals R−Y and B−Y. These counts N1, N2, and N3 are set to "4", "2", and "2", respectively, for example. The block count input section 22 is supplied in response to an action conducted by the operator or from an external system controller with the total block counts N1, N2, and N3, which are then sent to the block counter 20.

The block counter 20 counts, when an orthogonal transformation and an encoding are achieved, the number of blocks thus processed, namely, the number of blocks delivered from the two-dimensional orthogonal transformation section 14 to the dc component encoder 28a or the normalizing section 16. Depending on a result of the count, the counter 20 produces a switch signal as shown in FIG. 3 to conduct a change-over operation for the processing of the normalizer 16, the dc component encoder 28a, and the ac component encoder 28b.

Operations of this apparatus will now be described.

In this apparatus, color image data supplied from the input terminal 10 is processed through an orthogonal transformation and an encoding for a dc component Y−DC of the luminance signal Y, a dc component Cr−DC of the color difference signal R−Y, a dc component Cb−DC of the color difference signal B−Y, an ac component Y−AC of the luminance signal Y, an ac component Cr−AC of the color difference signal R−Y, and an ac component Cb−AC of the color difference signal B−Y in this order, thereby producing resultant signals on the output terminal 32.

The block counter 20 is beforehand loaded, as described above, with the total block counts N1, N2, and N3 respectively set for the luminance signal Y and the color difference signals R−Y and B−Y.

The block counter 20 counts, when the orthogonal transformation and the encoding are accomplished, the number of blocks thus processed, namely, the number of blocks sent from the two-dimensional orthogonal transformation section 14 to the dc component encoder 28a or the normalizing section 16 so as to produce a switch signal depending on a result of the count as shown in FIG. 3. First, as described above, the system processes the dc component Y−DC of the luminance signal Y. Namely, the luminance signal Y is supplied from the input terminal 10 to the transformation section 14, which conducts a two-dimensional orthogonal transformation on the luminance signal Y. As a result, a dc component of the transformation coefficient thus transformed is delivered to the dc component encoder 28a for an encoding thereof. The block counter keeps outputting a switch signal 001 of FIG. 3 while the encoding operation is achieved on the dc component Y−DC of the luminance signal Y.

The normalizing section 16 and the dc component encoder 28a are supplied with switch signals S1 and S0 from the block counter 20. Because these signals are set as S1=0 and S0=1, the normalizer 16 and the encoder 28a are respectively loaded with a normalization coefficient and a Huffman table to process Y−DC. Namely, the encoder 28a carries out an encoding for the Y−DC. The multiplexer 50 is supplied with a switch signal S2, which is "0" in this case. In consequence, the multiplexer 50 selects an output from the dc component encoder 28a to send the output signal to the output terminal 32.

The block counter 20 counts the number of blocks fed from the two-dimensional orthogonal transformation section 14 to the dc component encoder 28a. When the block count reaches the block count N1 associated with the luminance signal Y, the counter 20 creates the switch signal '010' of FIG. 3. This notifies the dc component encoder 28a of a change-over to the processing of the dc component Cr−DC of the color difference signal R−Y. The encoder 28a is then loaded with a Huffman table for the Cr−DC processing. In association with the switch operation, the ac component of the transformation coefficient of the color difference signal R−Y which has undergone the two-dimensional orthogonal transformation is delivered to the dc component encoder 28a for an encoding thereof. The block counter 20 continuously produces the switch signal '010' while the encoding is achieved on the dc component Cr−DC of the color difference signal R−Y. The encoder 28a carries out an encoding of Cr−DC. The multiplexer 50 delivers an output signal from the dc component encoder 28a to the output terminal 32.

Similarly, the block counter 20 counts the number of blocks created from the transformation section 14 to produce a switch signal '011' of FIG. 3 when the block number reaches the block count N2 assigned to the color difference signal Cr. As a result, the encoder 28a accomplished an encoding for Cb−DC and the multiplexer 50 sends an output from the encoder 28a to the output terminal 32.

Furthermore, the block counter 20 counts the number of blocks generated from the two-dimensional orthogonal transformation section 14 to create a switch signal '101' of FIG. 3 when the block number reaches the block count N3 specified for the color difference signal Cb. Than the normalizer 16 and the ac component encoder 28b are respectively loaded with a normalization coefficient and a Huffman table to carry out the Y−AC processing. The normalizer 16 normalizes an ac component of the transformation coefficient sent from the transformation section 14. The encoder 28b accomplishes an encoding for Y−AC. The multiplexer 50 is supplied with a switch signal S2=1 and hence sends an output from the encoder 28b to the output terminal 32.

In a similar manner, the switch signal from the block counter 20 is changed so as to sequentially execute the processing of the ac component Cr−AC of the color difference signal R−Y and the ac component Cb−AC of the color difference signal B−Y.

When the processing of the ac component Cb−AC of the color difference signal B−Y is finished, the block counter 20 produces a switch signal '000'. This establishes a mode for an initialization in which, for example, new values of the total block counts N1, N2, and N3, a normalization coefficient, and a Huffman table are transferred. Thereafter, the system enters a state awaiting the next image data, thereby completing the operation.

In this apparatus, as described above, the block counter counts the number of blocks to be processed. Each time the count value reaches the block count N1, N2, or N3 preset from the block count input section 22 thereto, a switch signal is produced. Consequently, the normalizer 16 can normalize the data by setting a normalization coefficient suitable for each of the luminance signal Y and the color difference signals R−Y and B−Y. The dc and ac component encoders 28a and 28b also can respectively achieve encoding operations for each of these signals. The multiplexer 50 selects as an output therefrom either one of the processed dc and ac components.

According to the apparatus described above, since the switch operations can be achieved on the normalization and encoding based on the block count thus obtained, the orthogonal transformation encoding can be conducted also for image data having different block counts so that image data constituted with various numbers of blocks can be processed.

Although the block size is fixed in the description of the embodiment above in which the image data processing is conducted with various block counts, it may also be possible to dispose a pixel counter to count the number of pixels in place of the block count such that a switch signal is generated depending on the pixel count to switch between processing, thereby applying the apparatus to the compression encoding of image data having different block sizes.

Figure 2:
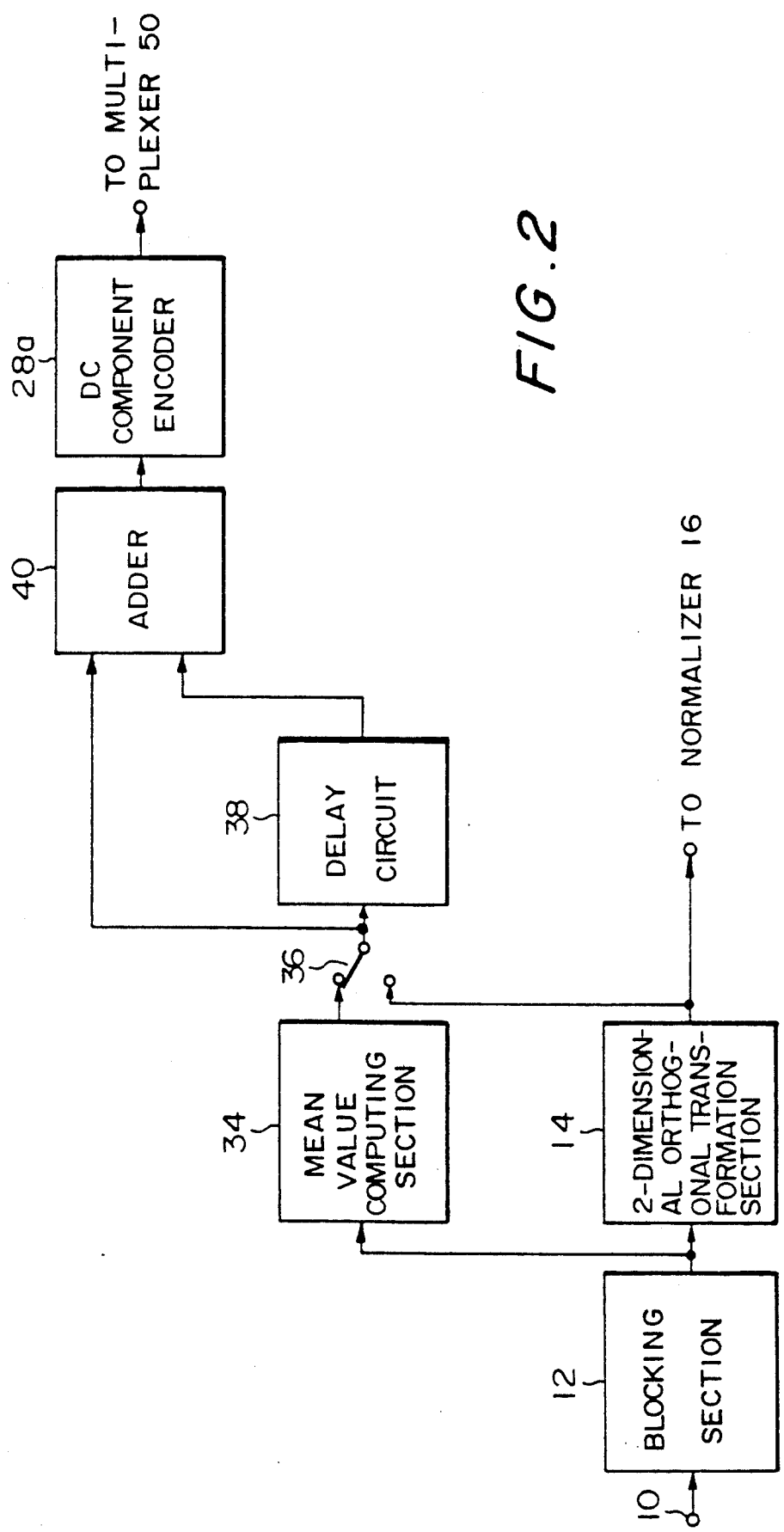
FIG. 2 is a schematic block diagram showing a portion of an alternative embodiment of the image signal compression encoding apparatus in accordance with the present invention.

FIG. 2 shows a portion of an alternative embodiment of the image signal compression encoder in accordance with the present invention. In this apparatus, the data resultant from the 2-dimensional orthogonal transformation section 14 are inputted to the dc component encoder 28a after being processed by the other sections.

The configuration of FIG. 2 includes a blocking section 12 supplying an output to a mean value computing section 34. This section 34 computes a mean value of image data of the respective blocks supplied from the blocking section 12. The obtained mean value is equivalent to a dc component developed by a two-dimensional orthogonal transformation section 14. The mean value is fed from the mean value computing section 34 to a switch 36. The two-dimensional orthogonal transformation section 14 also supplies a dc component output to the switch 36. The switch 36 is beforehand connected to a terminal so as to supply an adder 40 and a delay circuit 38 with the mean value output from the computing section 34 or the dc component output equivalent thereto from the transformation section 14. The delay circuit 38 delays by one block, mean value data of the blocks received via the switch 36. The delay circuit 38 produces an output. The system inverts the sign thereof so as to feed the resultant signal to the adder 40.

The adder 40 adds data received via the switch 36 to the data thus supplied from the delay circuit to obtain a difference between the mean value data of the blocks and that of the preceding blocks. The adder 40 delivers a resultant difference to a dc component encoder 28a. In this embodiment, consequently, the encoder 28a encodes data representing the difference between the mean values of the respective blocks above.

In this apparatus, the difference data between the mean values of the respective blocks is encoded and hence the efficiency of the encoding is further improved.

In accordance with the present invention, the compression encoding apparatus detects events that the amount of image data to be processed reaches the associated data amounts of the respective components to switch processing based on the events. In consequence, the compression encoding can be appropriately accomplished on image data having different effective pixel counts.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image signal compression encoding apparatus in which digital image data representative of an image frame is subdivided into a plurality of blocks to conduct a two-dimensional orthogonal transformation encoding on image data of each of said blocks, comprising:
   orthogonal transform means for achieving a two-dimensional orthogonal transformation on the plurality of blocks of the digital image data;
   normalize means for normalizing data resultant from the orthogonal transformation achieved by said orthogonal transform means;
   encode means for encoding data resultant from the orthogonal transformation and data resultant from noralization by said normalize means; and
   control means for detecting when an output from said orthogonal transform means reaches an amount of data of respective components of the digital image data constituting the image frame, said respective components being processed in different manners and for producing control signals according to the detection;
   said control means switching processing of said normalize means and said encode means depending on said control signals.

2. An apparatus in accordance with claim 1, wherein said control means detects when an output from said orthogonal transform means reaches a predetermined block count of the respective components of the digital image data.

3. An apparatus in accordance with claim 2, wherein said control means outputs a three-bit switch signal until said control means detects when an output from said orthogonal transform means reaches the block count of one of the respective components of the digital image data.

4. An apparatus in accordance with claim 1, wherein said control means detects when an output from said normalize means reaches a predetermined pixel count of data of the respective components constituting the digital image data.

5. An apparatus in accordance with claim 4 wherein said control means outputs a three-bit switch signal until said control means detects when an output from said normalize means reaches one of the pixel counts of data of the respective components constituting the digital image data.

6. An apparatus in accordance with claim 1, further including:
   delay means for delaying by one block data of a mean value of the respective blocks; and
   means value difference compute means for computing a difference between data of the mean value and data delayed by said delay means;
   said encode means encoding a value of the difference between the mean values of the blocks computed by said mean value difference compute means.

7. An apparatus in accordance with claim 6, further including;
  mean value compute means for computing a mean value of the respective blocks thus subdivided; and
  select means for selecting either component data from said mean value compute means or ac component data which has undergone the two-dimensional transformation,
  an output from said select means being employed as data of the mean value of the blocks.

8. An apparatus in accordance with claim 1, wherein said encode means includes:
  dc component encode means for encoding a dc component of data obtained through the orthogonal transformation achieved by said orthogonal transform means; and
  ac component encode means for encoding ac component data obtained through the normalization achieved by said normalize means.

9. An apparatus in accordance with claim 8, further including a multiplexer for selecting as an output either from an output of said dc component encoding means or an output of said ac component encode means.

10. An apparatus in accordance with claim 9, wherein said respective components to be processed in the different manners include dc and ac components respectively of a luminance signal Y, a color difference signal R−Y, and a color difference signal B−Y.

11. An apparatus in accordance with claim 10, wherein said control means controls said normalize means, said dc component encode means, and said ac component encode means so that said multiplexer produces data resultant from encoding by said encode means in an order of a dc component of the luminance signal Y, a dc component of the color difference signal R−Y, a dc component of the color difference signal B−Y, an ac component of the luminance signal Y, an ac component of the color difference signal R−Y, and an ac component of the color difference signal B−Y.

* * * * *